US012719522B2

(12) United States Patent
Wang et al.

(10) Patent No.: US 12,719,522 B2
(45) Date of Patent: Aug. 25, 2026

(54) WIRELESS CIRCUITRY WITH RECONFIGURABLE MATCHING NETWORKS

(71) Applicant: Apple Inc., Cupertino, CA (US)

(72) Inventors: Fei Wang, Sunnyvale, CA (US); Xiang Guan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 18/471,536

(22) Filed: Sep. 21, 2023

(65) Prior Publication Data

US 2025/0105869 A1 Mar. 27, 2025

(51) Int. Cl.

| | |
|---|---|
| ***H04B 1/40*** | (2015.01) |
| ***H01P 1/00*** | (2006.01) |
| ***H01P 3/10*** | (2006.01) |
| ***H01Q 5/50*** | (2015.01) |
| ***H01Q 21/30*** | (2006.01) |
| ***H03F 3/19*** | (2006.01) |
| ***H04B 5/00*** | (2024.01) |

(52) U.S. Cl.
CPC ...................................... *H04B 1/40* (2013.01)

(58) Field of Classification Search
None
See application file for complete search history.

(56) References Cited

U.S. PATENT DOCUMENTS 7,991,375 B2 * 8/2011 Afsahi ................ H03F 3/45475 455/341
8,779,857 B2 * 7/2014 Pletcher .................. H03F 1/086 330/310
8,779,868 B2 * 7/2014 White ................. H04B 1/0458 333/32
8,868,011 B2 * 10/2014 Wright ...................... H03F 1/02 455/114.1

(Continued)

OTHER PUBLICATIONS

Fei Wang et al., An Artificial-Intelligence (AI) Assisted Mm-Wave Doherty Power Amplifier with Rapid Mixed-Mode In-Field Performance Optimization, 2019 IEEE MTT-S International Microwave Conference on Hardware and Systems for 5G and Beyond (IMC-5G), Aug. 2019, IEEE, New York, NY, United States.

(Continued)

*Primary Examiner* — Tuan A Tran
(74) *Attorney, Agent, or Firm* — Treyz Law Group, P.C.; Michael H. Lyons

(57) ABSTRACT

An electronic device may include wireless circuitry with a transmission line path coupled between a transceiver and antenna. An amplifier may be disposed on the transmission line path. The amplifier may have a reconfigurable matching network at its output. The network may have coupled lines such as transmission line segments or transformer coils. The coupled lines may couple an input port of the network to a load port and a control port of the network. The load port may be coupled to the antenna. The control port may be coupled to an adjustable termination. The control port may receive a control signal that configures the adjustable ter- (Continued)

mination to exhibit an impedance selected based on a VSWR of the antenna. The impedance of the adjustable termination may be tuned so the amplifier sees a consistent load impedance at the load port even as the VSWR of the antenna changes over time.

20 Claims, 8 Drawing Sheets

(56) References Cited

U.S. PATENT DOCUMENTS 8,971,219 B2 * 3/2015 Choksi .................... H03H 7/09
370/282
9,000,847 B2 * 4/2015 Zhao ...................... H03F 1/223
330/310
9,143,172 B2 * 9/2015 See ........................ H03F 3/24
9,184,722 B2 * 11/2015 Bakalski ................ H03H 7/38
9,698,758 B2 * 7/2017 Spears ................ H04B 1/0458
9,722,577 B2 * 8/2017 McKinzie, III ......... H04B 1/44
9,768,810 B2 * 9/2017 Greene .................. H04B 1/18
9,853,622 B2 * 12/2017 McKinzie, III ......... H03H 7/38
9,859,844 B1 * 1/2018 Amiot ..................... H03F 3/26
9,941,910 B2 * 4/2018 Zhu ..................... H04B 1/0458
9,979,359 B2 * 5/2018 McCallister ............ H03F 1/56
10,003,313 B2 * 6/2018 Sato ...................... H03F 1/565
10,193,521 B2 * 1/2019 Bakalski ............... H01F 29/02
10,382,098 B2 * 8/2019 Hueber ................ H04B 5/266
10,826,457 B2 * 11/2020 Chi .................... H03F 3/45179
11,171,663 B2 * 11/2021 Gruber .................... H03H 7/38
11,688,916 B2 * 6/2023 Niida ....................... H01P 1/00
343/850
11,973,474 B2 * 4/2024 Wang ................. H03F 3/45179
2019/0245507 A1 * 8/2019 Chi ........................ H03F 3/195
2021/0249745 A1 * 8/2021 Niida ..................... H03F 3/245

OTHER PUBLICATIONS

Fei Wang et al., A Broadband Linear Ultra-Compact mm-Wave Power Amplifier With Distributed-Balun Output Network: Analysis and Design, IEEE Journal of Solid-State Circuits, Aug. 2021, pp. 2308-2323, vol. 56, No. 8, IEEE, New York, NY, United States.

Fei Wang et al., A High-Power Broadband Multi-Primary DAT-Based Doherty Power Amplifier for mm-Wave 5G Applications, IEEE Journal of Solid-State Circuits, Jun. 2021, pp. 1668-1681, vol. 56, No. 6, IEEE, New York, NY, United States.

Fei Wang et al., A Super-Resolution Mixed-Signal Doherty Power Amplifier for Simultaneous Linearity and Efficiency Enhancement, IEEE Journal of Solid-State Circuits, Dec. 2019, pp. 3421-3436, vol. 54, No. 12, IEEE, New York, NY, United States.

Shaojie Xu et al., In-Field Performance Optimization for mm-Wave Mixed-Signal Doherty Power Amplifiers: A Bandit Approach, IEEE Transactions On Circuits and Systems—I: Regular Papers, Dec. 2020, pp. 5302-5315, vol. 67, No. 12, IEEE, New York, NY, United States.

* cited by examiner

WIRELESS CIRCUITRY WITH RECONFIGURABLE MATCHING NETWORKS

FIELD

This disclosure relates generally to electronic devices and, more particularly, to electronic devices with wireless communications circuitry.

BACKGROUND

Electronic devices are often provided with wireless circuitry. The wireless circuitry includes amplifiers and antennas. The amplifiers amplify radio-frequency signals conveyed by the antennas.

It can be challenging to provide wireless circuitry with satisfactory levels of radio-frequency performance. If care is not taken, changes in environmental loading of the antennas can degrade linearity of the amplifiers.

SUMMARY

An electronic device may include wireless circuitry for performing wireless communications. The wireless circuitry may include a transmission line path coupled between a transceiver and antenna. An amplifier may be disposed on the transmission line path. The amplifier may have a reconfigurable matching network at its output. The amplifier may be a power amplifier, a low noise amplifier, or a bi-directional amplifier.

The reconfigurable matching network may have coupled lines such as transmission line segments or transformer coils. The coupled lines may couple an input port of the reconfigurable matching network to a load port and to a control port of the reconfigurable matching network. The load port may be coupled to the antenna. The control port may be coupled to an adjustable termination. The control port may receive a control signal that configures the adjustable termination to exhibit a selected impedance. The impedance may be selected based on a load impedance or voltage standing wave ratio (VSWR) of the antenna. The impedance of the adjustable termination may be tuned so the amplifier sees a consistent load impedance at the load port even as the VSWR of the antenna changes over time, thereby maximizing linearity of the amplifier and radio-frequency performance of the wireless circuitry.

An aspect of the disclosure provides an amplifier having an input and an output. The amplifier can include a gain stage communicably coupled to the input. The amplifier can include a matching network having first and second ports coupled to the gain stage, a third port at the output, and a fourth port. The matching network can include first coupled lines that couple the first port to the third port. The matching network can include second coupled lines that couple the second port to the fourth port. The matching network can include an adjustable termination coupled to the fourth port.

An aspect of the disclosure provides an amplifier having an input and an output. The amplifier can include a gain stage communicably coupled to the input. The amplifier can include a matching network having first and second ports coupled to the gain stage, a third port at the output, and a fourth port. The matching network can include a transformer having a first coil coupled between the first port and the second port and having a second coil coupled between the third port and the fourth port. The matching network can include an adjustable termination coupled to the fourth port.

An aspect of the disclosure provides an electronic device. The electronic device can include a transceiver. The electronic device can include an antenna. The electronic device can include a transmission line path that couples the transceiver to the antenna, the transceiver being configured to convey a radio-frequency signal over the transmission line path and the antenna. The electronic device can include an amplifier disposed on the transmission line path and configured to amplify the radio-frequency signal, wherein the amplifier has an output matching network that includes an input port communicably coupled to the transceiver, a load port communicably coupled to the antenna, a control port, coupled lines having a first line coupled to the input port and having a second line coupled between the load port and the control port, and an adjustable termination coupled to the control port.

DETAILED DESCRIPTION

Figure 1:
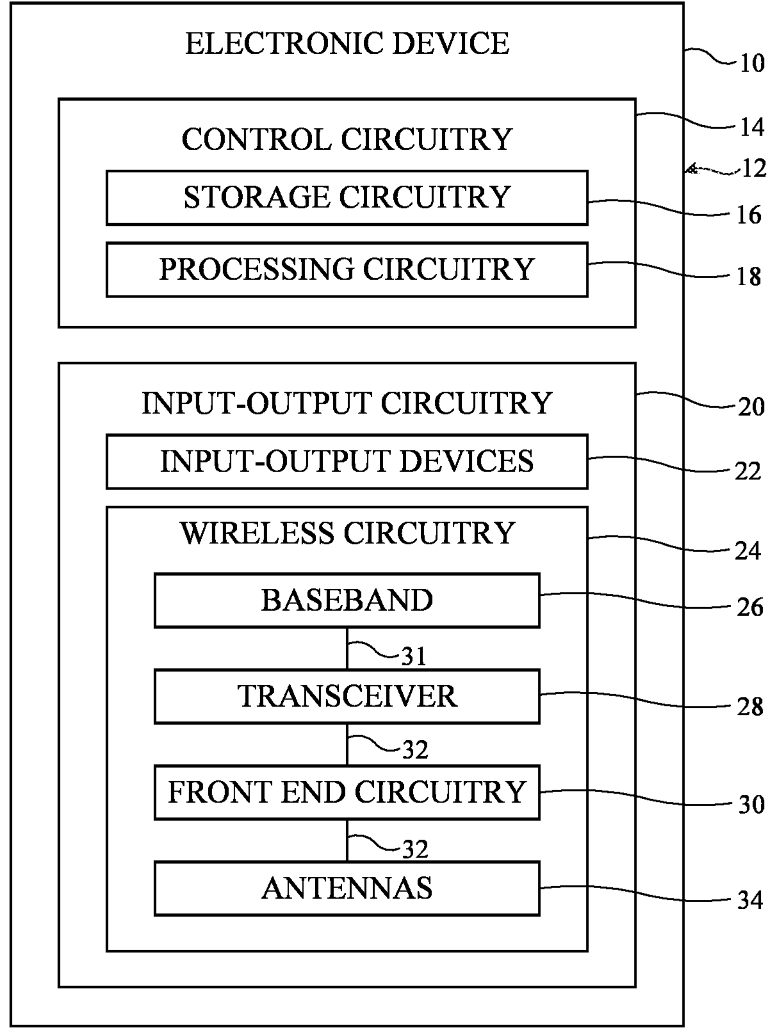
FIG. 1 is a schematic diagram of an illustrative electronic device having wireless circuitry in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head (e.g., a head-mounted device or head-mounted display), or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors such as microprocessors, microcontrollers, digital signal processors, host processors, baseband processor integrated circuits, application specific integrated circuits, central processing units (CPUs), graphics processing units (GPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 3GPP Fifth Generation (5G) New Radio (NR) protocols, Sixth Generation (6G) protocols, sub-THz protocols. THz protocols, etc.), antenna diversity protocols, satellite navigation system protocols (e.g., global positioning system (GPS) protocols, global navigation satellite system (GLONASS) protocols, etc.), antenna-based spatial ranging protocols, optical communications protocols, or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24 or radio-frequency circuitry 24) may include baseband circuitry such as baseband circuitry 26 (e.g., one or more baseband processors and/or other circuitry that operates at baseband), radio-frequency (RF) transceiver circuitry such as transceiver 28, radio-frequency front end circuitry such as front end circuitry 30, and one or more antennas 34. If desired, wireless circuitry 24 may include multiple antennas 34 that are arranged into a phased antenna array (sometimes referred to as a phased array antenna) that conveys radio-frequency signals within a corresponding signal beam that can be steered in different directions. Baseband circuitry 26 may be coupled to transceiver 28 over one or more baseband signal paths 31. Baseband circuitry 26 may include, for example, modulators (encoders) and demodulators (decoders) that operate on baseband signals. Transceiver 28 may be coupled to antennas 34 over one or more transmission line paths 32. Front end circuitry 30 may be disposed on transmission line path(s) 32 between transceiver 28 and antennas 34.

In the example of FIG. 1, wireless circuitry 24 is illustrated as including only a single transceiver 28 and a single transmission line path 32 for the sake of clarity. In general, wireless circuitry 24 may include any desired number of transceivers 28, any desired number of transmission line paths 32, and any desired number of antennas 34. Each transceiver 28 may be coupled to one or more antennas 34 over respective transmission line paths 32. Each transmission line path 32 may have respective front end circuitry 30 disposed thereon. If desired, front end circuitry 30 may be shared by multiple transmission line paths 32.

Transmission line path(s) 32 may be coupled to antenna feeds on one or more antennas 34. Each antenna feed may, for example, include a positive antenna feed terminal and a ground antenna feed terminal. Each transmission line path 32 may include a positive transmission line signal path (signal conductor) that is coupled to one or more positive antenna feed terminals and may have a ground transmission line signal path (ground conductor) that is coupled to the ground antenna feed terminal. This example is merely illustrative and, in general, antennas 34 may be fed using any desired antenna feeding scheme.

Each transmission line path 32 may include one or more radio-frequency transmission lines that are used to route radio-frequency signals within device 10. Radio-frequency transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission line path 32 may also include radio-frequency connectors that couple multiple radio-frequency transmission lines together. Radio-frequency transmission lines in transmission line path 32 may be integrated into rigid and/or flexible printed circuit boards. In some implementations, radio-frequency transmission lines may also include transmission line conductors integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). If desired, one or more transmission line paths 32 may include one or more optical transmission lines (e.g., optical fibers or waveguides in implementations where transceiver 28 includes electro-optical transceiver circuitry) instead of or in addition to radio-frequency transmission lines.

In performing wireless transmission, baseband circuitry 26 may provide baseband signals to transceiver 28 over baseband signal path(s) 31. Transceiver 28 may sometimes also be referred to herein as radio 28. Transceiver 28 (e.g., one or more transmitters in transceiver 28) may include circuitry for converting the baseband signals received from baseband circuitry 26 into corresponding radio-frequency signals. For example, transceiver 28 may include mixer circuitry that up-converts the baseband signals to radio frequencies prior to transmission over antennas 34. Transceiver 28 may also include digital to analog converter (DAC) and/or analog to digital converter (ADC) circuitry that converts signals between digital and analog domains. Transceiver 28 may transmit the radio-frequency signals over antennas 34 via transmission line path 32 and front end circuitry 30. Antennas 34 may transmit the radio-frequency signals to external wireless equipment by radiating the radio-frequency signals into free space.

In performing wireless reception, antennas 34 may receive radio-frequency signals from the external wireless equipment. The received radio-frequency signals may be conveyed to transceiver 28 via transmission line path 32 and front end circuitry 30. Transceiver 28 may include circuitry for converting the received radio-frequency signals into corresponding baseband signals. For example, transceiver 28 may include one or more receivers having mixer circuitry that down-converts the received radio-frequency signals to baseband frequencies prior to conveying the baseband signals to baseband circuitry 26.

Front end circuitry 30 may include radio-frequency front end components that operate on radio-frequency signals conveyed over radio-frequency transmission lines in transmission line path 32. If desired, the radio-frequency front end components may be formed within one or more radio-frequency front end modules (FEMs). Each FEM may include a common substrate such as a printed circuit board substrate for each of the radio-frequency front end components in the FEM. The radio-frequency front end components in front end circuitry 30 may include switching circuitry (e.g., one or more radio-frequency switches), radio-frequency filter circuitry (e.g., low pass filters, high pass filters, notch filters, band pass filters, multiplexing circuitry, duplexer circuitry, diplexer circuitry, triplexer circuitry, etc.), impedance matching circuitry (e.g., circuitry that helps to match the impedance of antennas 34 to the impedance of transmission line path 32), antenna tuning circuitry (e.g., networks of capacitors, resistors, inductors, and/or switches that adjust the frequency response of antennas 34), radio-frequency amplifier circuitry (e.g., power amplifier circuitry and/or low-noise amplifier circuitry), radio-frequency coupler circuitry, charge pump circuitry, power management circuitry, digital control and interface circuitry, and/or any other desired circuitry that operates on the radio-frequency signals transmitted and/or received by antennas 34.

While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, baseband circuitry 26 and/or portions of transceiver 28 (e.g., a host processor on transceiver 28) may form a part of control circuitry 14.

Wireless circuitry 24 may transmit and/or receive wireless signals within corresponding frequency bands of the electromagnetic spectrum (sometimes referred to herein as communications bands or simply as "bands"). The frequency bands handled by wireless circuitry 24 may include wireless local area network (WLAN) frequency bands (e.g., Wi-Fi® (IEEE 802.11) or other WLAN communications bands) such as a 2.4 GHZ WLAN band (e.g., from 2400 to 2480 MHz), a 5 GHZ WLAN band (e.g., from 5180 to 5825 MHZ), a Wi-Fi® 6E band (e.g., from 5925-7125 MHZ), and/or other Wi-Fi® bands (e.g., from 1875-5160 MHZ), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-100 GHz, near-field communications (NFC) frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Over time, software applications on electronic devices such as device 10 have become more and more data intensive. Wireless circuitry on the electronic devices therefore needs to support data transfer at higher and higher data rates. In general, the data rates supported by the wireless circuitry are proportional to the frequency of the wireless signals conveyed by the wireless circuitry (e.g., higher frequencies can support higher data rates than lower frequencies). Wireless circuitry 24 may convey centimeter and millimeter wave signals to support relatively high data rates (e.g., because centimeter and millimeter wave signals are at relatively high frequencies between around 10 GHz and 100 GHz). However, the data rates supported by centimeter and millimeter wave signals may still be insufficient to meet all the data transfer needs of device 10. To support even higher data rates such as data rates up to 5-10 Gbps or higher, wireless circuitry 24 may convey wireless signals at frequencies greater than about 100 GHz.

For example, transceiver 28 and wireless circuitry 24 may transmit and/or receive radio-frequency signals in one or more frequency bands greater than around 100 GHz (e.g., greater than 70 GHz, 80 GHZ, 90 GHZ, 110 GHZ, 200 GHz, 300 GHz, etc.). Radio-frequency signals at these frequencies are sometimes also referred to as tremendously high frequency (THF) signals, sub-THz, THz signals, or sub-millimeter wave signals. The THF signals may be at sub-THz or THz frequencies such as frequencies between 100 GHz and 1 THz, between 100 GHz and 10 THz, between 100 GHz and 2 THz, between 200 GHz and 1 THz, between 300 GHz and 1 THz, between 300 GHz and 2 THz, between 70 GHz and 2 THz, between 300 GHz and 10 THz, between 100 GHz and 800 GHz, between 200 GHz and 1.5 THz, etc. (e.g., within a sub-THz, THz. THF, or sub-millimeter frequency band such as a 6G frequency band). The high data rates supported by these frequencies may be leveraged by device 10 to perform cellular telephone voice and/or data communications (e.g., while supporting spatial multiplexing to provide further data bandwidth), to perform spatial ranging operations such as radar operations to detect the presence, location, and/or velocity of objects external to device 10, to perform automotive sensing (e.g., with enhanced security), to perform health/body monitoring on a user of device 10 or another person, to perform gas or chemical detection, to form a high data rate wireless connection between device 10 and another device or peripheral device (e.g., to form a high data rate connection between a display driver on device 10 and a display that displays ultra-high resolution video), to form a remote radio head (e.g., a flexible high data rate connection), to form a THF chip-to-chip connection within device 10 that supports high data rates (e.g., where one antenna on a first chip in device 10 transmits THF signals to another antenna on a second chip in device 10), and/or to perform any other desired high data rate operations.

Antennas 34 may be formed using any desired antenna structures. For example, antennas 34 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures (e.g., bowtie antenna structures), hybrids of these designs, etc. Parasitic elements may be included in antennas 34 to adjust antenna performance.

Filter circuitry, switching circuitry, impedance matching circuitry, and other circuitry may be interposed within transmission line path 32, may be incorporated into front end circuitry 30, and/or may be incorporated into antennas 34 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antennas 34 over time.

In general, transceiver 28 may cover (handle) any suitable communications (frequency) bands of interest. The transceiver may convey radio-frequency signals using antennas 34 (e.g., antennas 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 34 may transmit the radio-frequency signals by radiating the radio-frequency signals into free space (or to free space through intervening device structures such as a dielectric cover layer). Antennas 34 may additionally or alternatively receive the radio-frequency signals from free space (e.g., through intervening devices structures such as a dielectric cover layer). The transmission and reception of radio-frequency signals by antennas 34 each involve the excitation or resonance of antenna currents on an antenna resonating element in the antenna by the radio-frequency signals within the frequency band(s) of operation of the antennas.

In example where multiple antennas 34 are arranged in a phased antenna array, each antenna 34 may form a respective antenna element of the phased antenna array. Conveying radio-frequency signals using the phased antenna array may allow for greater peak signal gain relative to scenarios where individual antennas 34 are used to convey radio-frequency signals. In satellite navigation system links, cellular telephone links, and other long-range links, radio-frequency signals are typically used to convey data over thousands of feet or miles. In Wi-Fi® and Bluetooth® links at 2.4 and 5 GHZ and other short-range wireless links, radio-frequency signals are typically used to convey data over tens or hundreds of feet. In scenarios where millimeter wave, THz, or sub-THz frequencies are used to convey radio-frequency signals, a phased antenna array may convey radio-frequency signals over short to mid-range distances that travel over a line-of-sight path. To enhance signal reception for millimeter wave, THz, or sub-THz communications, the phased antenna array may convey radio-frequency signals using beam steering techniques (e.g., schemes in which antenna signal phase and/or magnitude for each antenna in an array are adjusted to perform beam steering).

Figure 2:
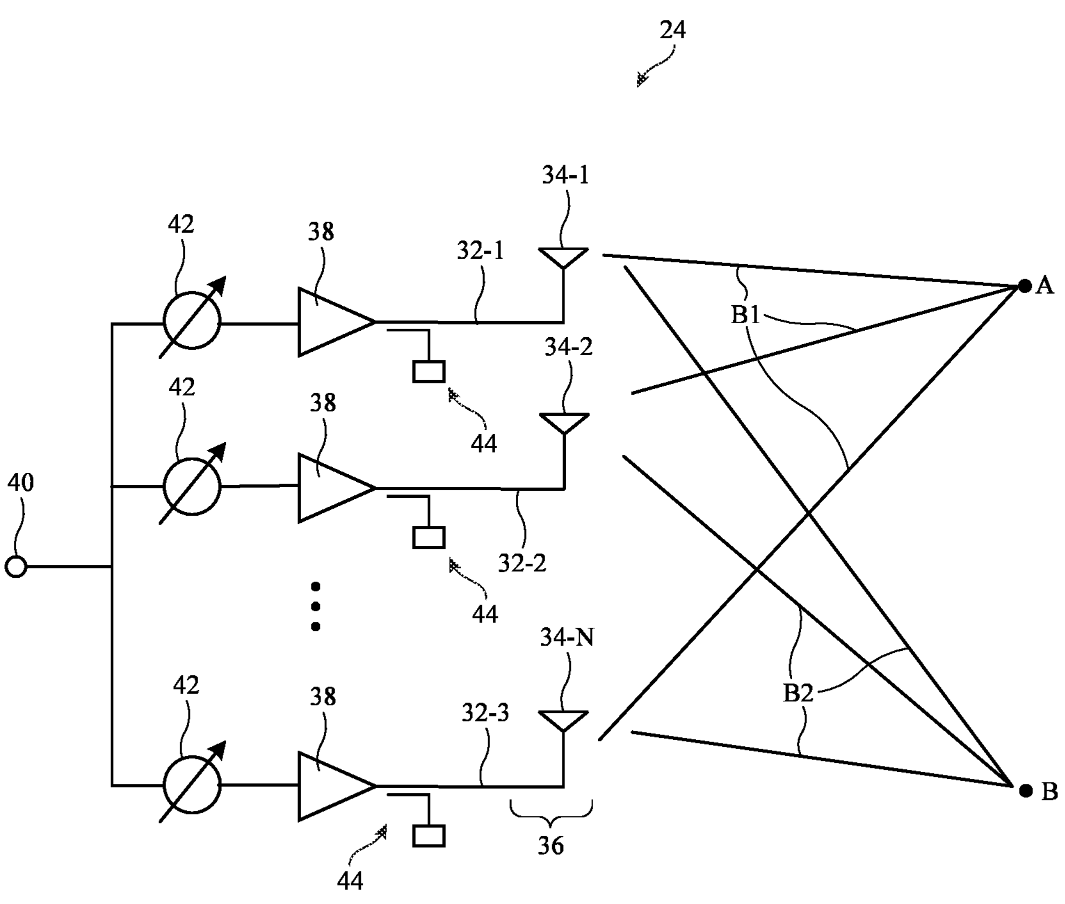
FIG. 2 is a diagram of an illustrative phased antenna array that may be adjusted to form signal beams oriented in different directions in accordance with some embodiments.

FIG. 2 shows how antennas 34 may be formed in a corresponding phased antenna array 36. As shown in FIG. 2, phased antenna array 36 (sometimes referred to herein as array 36, antenna array 36, or array 36 of antennas 34) may be coupled to transmission line paths 32. For example, a first antenna 34-1 in phased antenna array 36 may be coupled to a first transmission line path 32-1, a second antenna 34-2 in phased antenna array 36 may be coupled to a second transmission line path 32-2, an Nth antenna 34-N in phased antenna array 36 may be coupled to an Nth transmission line path 32-N, etc. While antennas 34 are described herein as forming a phased antenna array, the antennas 34 in phased antenna array 36 may sometimes also be referred to as collectively forming a single phased array antenna (e.g., where antennas 34 form antenna elements of the phased array antenna).

Antennas 34 in phased antenna array 36 may be arranged in any desired number of rows and columns or in any other desired pattern (e.g., the antennas need not be arranged in a grid pattern having rows and columns). Each antenna 34 may be separated from one or more adjacent antennas 34 in phased antenna array 36 by a predetermined distance such as approximately half an effective wavelength of operation of the array. During signal transmission, transmission line paths 32 may be used to supply signals (e.g., radio-frequency signals such as millimeter wave, sub-THz, or THz signals) from transceiver circuitry (e.g., via radio-frequency signal port 40) to phased antenna array 36 for wireless transmission. During signal reception, transmission line paths 32 may be used to supply signals received at phased antenna array 36 (e.g., from external wireless equipment or transmitted signals that have been reflected off of external objects) to transceiver circuitry (e.g., via radio-frequency signal port 40).

The use of multiple antennas 34 in phased antenna array 36 allows beam forming/steering arrangements to be implemented by controlling the relative phases and magnitudes (amplitudes) of the radio-frequency signals conveyed by the antennas. Each transmission line path 32 may therefore have a respective phase shifter 42 and a respective amplifier 38 disposed thereon. Amplifiers 38 may be power amplifiers, low noise amplifiers, or bi-directional amplifiers, as examples. The phase shifter 42 and the amplifier 38 on a given transmission line path 32 are sometimes also referred to collectively as a phase and magnitude controller.

Phase shifters 42 may adjust the phase of the radio-frequency signals on the corresponding transmission line paths 32. The phases imparted by phase shifters 42 may be adjusted over time (e.g., based on control signals received from control circuitry 14 of FIG. 1). Amplifiers 38 may adjust the magnitude (amplitude) of the radio-frequency signals on the corresponding transmission line paths. The magnitudes imparted by amplifiers 38 may be adjusted over time (e.g., based on control signals received from control circuitry 14 of FIG. 1). Phase shifters 42 and amplifiers 38 may be formed within front end circuitry 30 of FIG. 1, for example.

Phase shifters 42 and amplifiers 38 may adjust the relative phases and/or magnitudes of the transmitted signals that are provided to each of the antennas in phased antenna array 36 and may adjust the relative phases and/or magnitudes of the received signals that are received by phased antenna array 36. The term "beam" or "signal beam" may be used herein to collectively refer to radio-frequency (wireless) signals that are transmitted and/or received by phased antenna array 36 in a particular direction. Each beam may exhibit a peak gain that is oriented in a respective beam pointing direction at a corresponding beam pointing angle (e.g., based on constructive and destructive interference from the combination of radio-frequency signals transmitted by each antenna in the phased antenna array). Different sets of phase and magnitude settings for phase shifters 42 and amplifiers 38 may configure phased antenna array 36 to form different beams in different beam pointing directions.

If, for example, phase shifters 42 and amplifiers 38 are adjusted to produce a first set of phases and/or magnitudes, the signals will form a beam as shown by beam B1 of FIG. 2 that is oriented in the direction of point A. If, however, phase shifters 42 and amplifiers 38 are adjusted to produce a second set of phases and/or magnitudes, the signals will form a beam as shown by beam B2 that is oriented in the direction of point B. During signal transmission, the phases and magnitudes across phased antenna array 36 produce constructive and destructive interference that effectively point the signal beam of phased antenna array 36 in the corresponding beam pointing direction. During signal reception, the phases and magnitudes across antenna array 36 cause the radio-frequency signals received by phased antenna array 36 from within the signal beam to combine coherently when provided to radio-frequency signal port 40.

When performing wireless communications using radio-frequency signals at relatively high frequencies such as millimeter wave, sub-THz, or THz frequencies, radio-frequency signals are conveyed over a line-of-sight path between phased antenna array 36 and external communications equipment. If the external equipment is located at point A of FIG. 2, phase shifters 42 and amplifiers 38 may be adjusted to steer the signal beam towards point A (e.g., to steer the pointing direction of the signal beam towards point A). Phased antenna array 36 may transmit and receive radio-frequency signals in the direction of point A. Similarly, if the external equipment is located at point B, phase shifters 42 and amplifiers 38 may be adjusted to steer the signal beam towards point B (e.g., to steer the pointing direction of the signal beam towards point B). Phased antenna array 36 may transmit and receive radio-frequency signals in the direction of point B.

In the example of FIG. 2, beam steering is shown as being performed over a single degree of freedom for the sake of simplicity (e.g., towards the left and right on the page of FIG. 2). However, in practice, the beam may be steered over two or more degrees of freedom (e.g., in three dimensions, into and out of the page and to the left and right on the page of FIG. 2). Phased antenna array 36 may have a corresponding field of view over which beam steering can be performed (e.g., in a hemisphere or a segment of a hemisphere over the phased antenna array).

If desired, one, more than one, or each transmission line path 32 may have a radio-frequency sensor 44 disposed thereon (e.g., between the output of the corresponding amplifier 38 and the input of the corresponding antenna 34). Radio-frequency sensor 44 may include, for example, an impedance sensor or voltage standing wave ration (VSWR) sensor. The impedance sensor or VSWR sensor may include, for example, a signal coupler (e.g., a directional coupler or switch coupler), a sensing or feedback receiver, a power detector, a phase detector, and/or other radio-frequency sensor circuitry. The signal coupler may tap or couple some of the radio-frequency signals off of the corresponding transmission line path 32. The tapped or coupled signals may be measured to generate (e.g., measure, sense, identify, or detect) impedance information associated with the radio-frequency signals. The impedance information may include VSWR values or measurements, complex scattering parameter values or measurements (e.g., S-parameter values), reflection coefficient values or measurements, etc. Control circuitry 14 may process the measurements performed by radio-frequency sensors 44 to adjust the operation of wireless circuitry 24.

Phased antenna arrays such as phased antenna array 36 may exhibit a relatively high effective isotropic radiated power (EIRP), which helps to compensate for the relatively high frequencies of the radio-frequency signals. To allow signal beamforming, the antennas 34 in phased antenna array 36 are spaced relatively close together (e.g., on the order of half a wavelength). This tight spacing can cause electromagnetic coupling between the antennas 34 in phased antenna array 36. This can lead to variation of antenna driving port impedance or, more specifically, a VSWR mismatch at one or more of the antennas 34 in phased antenna array 36. The amount of VSWR mismatch is strongly dependent on the beam pointing angle and the position of the antenna 34 in phased antenna array 36.

This can pose increasingly stringent performance requirements on the RF front end of phased antenna array 36 and especially power amplifiers in the RF front end (e.g., power amplifiers in amplifiers 38). This is because power amplifier characteristics such as output power, energy efficiency, and linearity are critical for overall system performance including link budget, power consumption, thermal management, battery life, etc. As such, the power amplifier load impedance should be carefully selected and optimized for output power, efficiency, and linearity performance. However, output power, efficiency, and linearity performance can be significantly degraded due to VSWR mismatch between transmission line path 32 and the corresponding antenna 34. Large-signal AM-AM and AM-PM linearity in the power amplifiers is particularly important for communications protocols that exhibit higher-order complex modulation schemes such as 5G, which can be especially sensitive to load impedance.

If care is not taken, early compression or expansion due to impedance variations under different antenna VSWR levels can substantially deteriorate in-band and out-of-band linearity of the power amplifiers and thus the error vector magnitude (EVM) and adjacent channel power ratio (PAPR) of wireless circuitry 24. It would therefore be desirable to be able to recover the power amplifier performance or at least to mitigate degradation in terms of output power efficiency and linearity as the VSWR of the antenna changes over time (e.g., due to different environmental conditions loading the impedance of the antenna differently over time, such as when external objects move over or away from the antenna).

In some scenarios, the power amplifiers are protected or desensitized from load mismatch using isolators, circulators, or tunable matching networks. However, isolators and circulators at the output of the power amplifier can dissipate reflected power into a load, which reduces the power delivered to the antenna and thus overall system efficiency. In addition, isolators and circulators are non-reciprocal components that can be very lossy, bulky, and expensive to implement, particularly at relatively high frequencies. Further, inserting tunable elements for a tunable matching network directly into the path of the output signal from the power amplifier (e.g., in series between the output of the power amplifier and the antenna) can require the tunable elements to handle high-power signals, which can increase the signal loss produced by the tunable matching network.

To mitigate these issues and optimize the wireless performance of amplifiers 38 and thus wireless circuitry 24, amplifiers 38 may be provided with a reconfigurable coupled-line-based output matching network. The reconfigurable output matching network may include a termination impedance at a control port that is dynamically adjusted or switched to bring the load impedance seen by the power amplifier closer to the optimum value, thereby restoring power amplifier performance under a variety of antenna impedance variations (VSWRs). The reconfigurable output matching network can provide a broad radio-frequency bandwidth and does not place any tunable component directly in the path of the signal output by the power amplifier, thereby relaxing loss and power handling requirements of the matching network.

Figure 3:
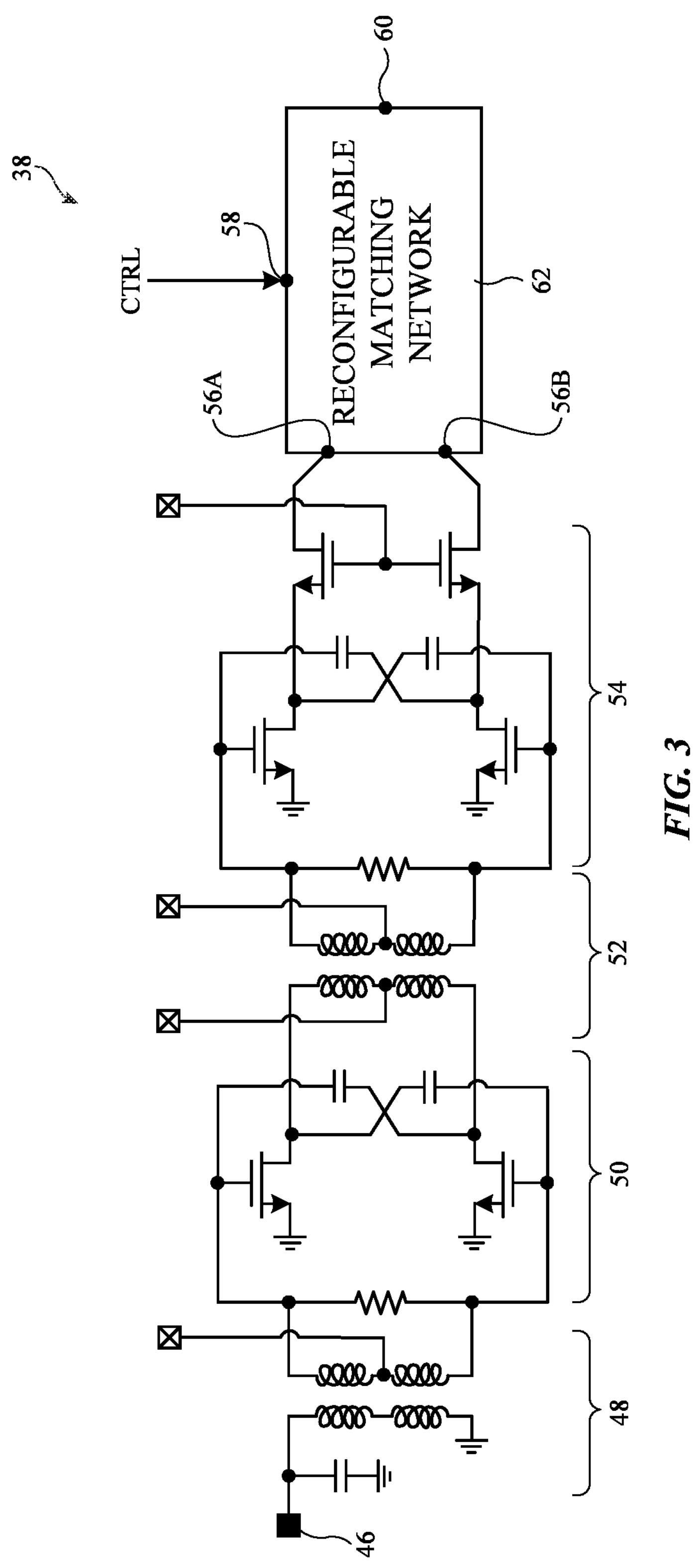
FIG. 3 is a schematic circuit diagram of an illustrative amplifier having a reconfigurable matching network in accordance with some embodiments.

FIG. 3 is a schematic circuit diagram showing how amplifier 38 (e.g., a power amplifier) may be provided with a reconfigurable matching network for optimizing antenna performance over antenna VSWRs. As shown in FIG. 3, amplifier 38 may have an input such as input port (terminal) 46. Input port 46 may be coupled to the output of the corresponding phase shifter 42 (FIG. 2) or other circuitry on the corresponding transmission line path 32 between amplifier 38 and transceiver 28 (FIG. 1). Amplifier 38 may also have an output port (terminal) 60 (sometimes also referred to herein as load port 60 or load terminal 60). Load port 60 may be communicably coupled to the corresponding antenna 34 or other circuitry on the corresponding transmission line path 32 between amplifier 28 and antenna 34.

Amplifier 38 may include input impedance matching circuitry such as input matching network (MN) 48, driver circuitry such as driver stage 50, inter-stage impedance matching circuitry such as inter-stage matching network 52, one or more power amplifier stages such as power amplifier stage 54 (sometimes also referred to herein as gain stage 54), and reconfigurable output impedance matching circuitry such as reconfigurable matching network 62, each coupled in series between input port 46 and load port 60. Reconfigurable matching network 62 is sometimes also referred to herein as reconfigurable (impedance) matching circuitry 62, reconfigurable output matching network 62, reconfigurable output matching circuitry 62, reconfigurable coupled-line based matching network 62, reconfigurable coupled-line based output matching network 62, reconfigurable transformer-based matching network 62, or reconfigurable transformer-based output matching network 62. While sometimes referred to herein as an output matching network of amplifier 38, reconfigurable matching network 62 does not include any tuning elements or circuit components (e.g., switches, resistors, capacitors, inductors, etc.) disposed on the radio-frequency signal path in series between power amplifier stage 54 and load port 60.

The example of FIG. 3 is illustrative and non-limiting. In general, input matching network 48, driver stage 50, inter-stage matching network 52, and power amplifier stage 54 may have any desired circuit components or circuit architectures. If desired, amplifier 38 may include more than one power amplifier stage 54. Amplifier 38 need not be a power amplifier and may, if desired, be a low noise amplifier (e.g., in a receive path) or a bi-directional amplifier. Amplifier 38 may have any desired architecture between input port 46 and reconfigurable matching network 62.

Reconfigurable matching network 62 may have an input port 56 coupled to power amplifier stage 54 (e.g., reconfigurable matching network 62 may be disposed at and/or may form the output of amplifier 38). The input port may be, for example, a differential input port having a first differential input port (terminal) 56A and a second differential input port (terminal) 56B. Power amplifier stage 54 may convey radio-frequency signals to reconfigurable matching network 62 over differential input ports 56A and 56B as a differential signal pair (e.g., referenced to each other rather than to a common reference plane). Alternatively, a single-ended signal architecture may be used in reconfigurable matching network 62 and/or the rest of amplifier 38.

Reconfigurable matching network 62 may also have a control port (terminal 58) that receives control signals CTRL from control circuitry 14 (FIG. 1). Reconfigurable matching network 62 may be a coupled-line-based matching network that includes one or more coupled-lines. The coupled lines may be electromagnetically coupled transmission line segments or transformer windings, as examples. Reconfigurable matching network 62 may include an adjustable impedance termination coupled between control port 58 and ground. The adjustable impedance termination is not disposed on the radio-frequency signal path between differential input ports 56A/56B and load port 60. Control signals CTRL may adjust the state of the adjustable impedance termination over time to optimize the wireless performance of amplifier 38 under different antenna loading conditions (e.g., VSWRs).

Figure 4:
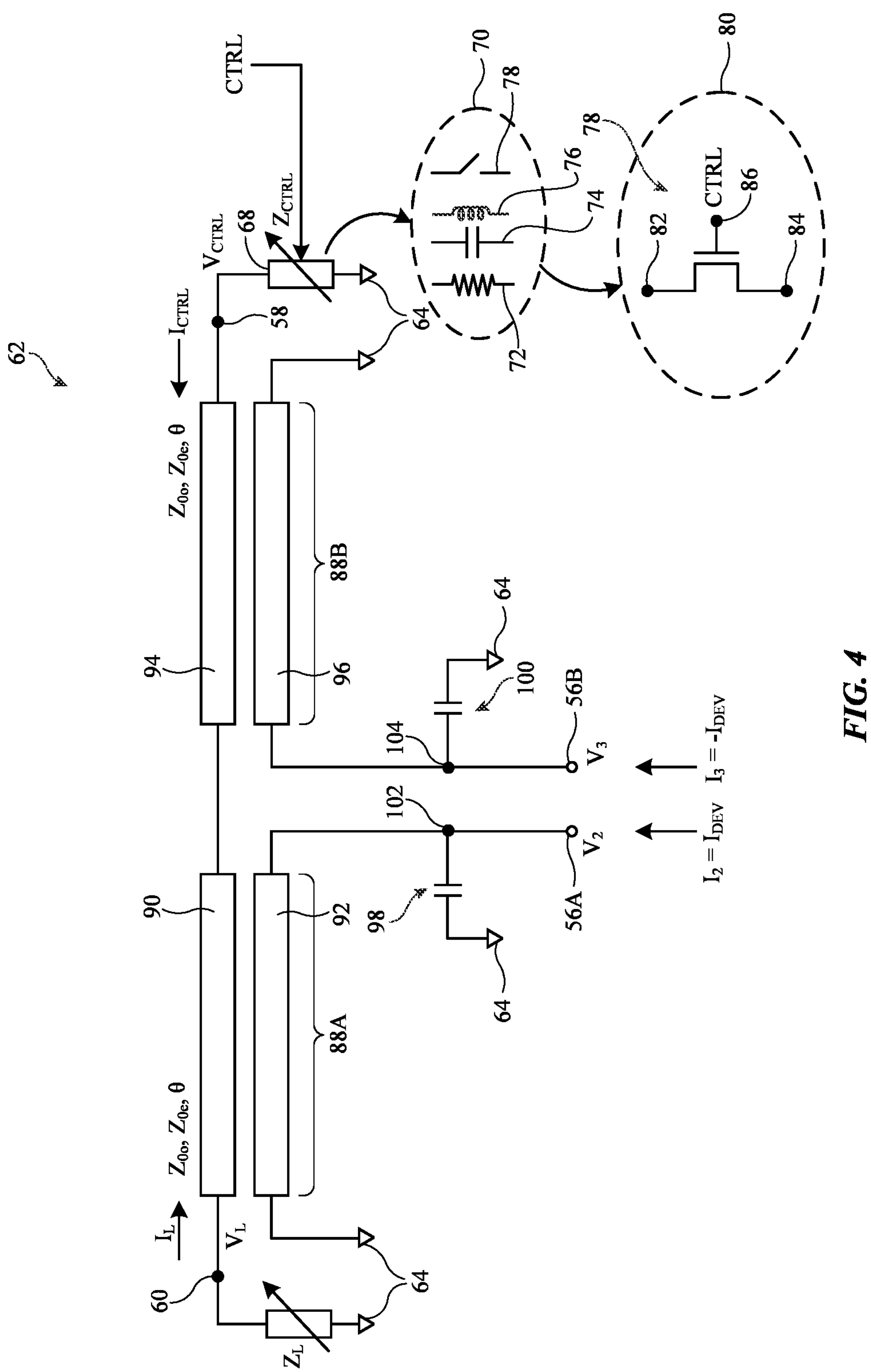
FIG. 4 is a circuit diagram of an illustrative coupled-line based reconfigurable matching network in accordance with some embodiments.

FIG. 4 is a circuit diagram of reconfigurable matching network 62 in an example where the coupled lines include electromagnetically coupled transmission line segments. Reconfigurable matching network 62 may include one or more coupled lines 88. As shown in the example of FIG. 4, reconfigurable matching network 62 may include first coupled lines 88A and second coupled lines 88B. Coupled lines 88A may be coupled between differential input port 56A and load port 60. Coupled lines 88B may be coupled between differential input port 56B and control port 58.

Coupled lines 88A may include a first line 92 and a second line 90 that extends along (e.g., parallel to) line 92 but that is spaced apart or separated from line 92. Lines 92 and 90 may include respective segments of radio-frequency transmission line and are therefore sometimes also referred to herein as transmission line segments 92 and 90. Transmission line segment 92 is electromagnetically coupled to transmission line segment 90 via near-field electromagnetic coupling (e.g., magnetic/inductive and/or electric/capacitive coupling).

Coupled lines 88B may include a first line 96 and a second line 94 that extends along (e.g., parallel to) line 96 but that is spaced apart or separated from line 96. Lines 96 and 94 may include respective segments of radio-frequency transmission line and are therefore sometimes also referred to herein as transmission line segments 96 and 94. Transmission line segment 96 is electromagnetically coupled to transmission line segment 94 via near-field electromagnetic coupling (e.g., magnetic/inductive and/or electric/capacitive coupling).

Transmission line segment 92 may be coupled in series between differential input port 56A and ground 64 (or another reference potential). Transmission line segment 96 may be coupled in series between differential input port 56B and ground 64 (or another reference potential). Transmission line segment 94 may be coupled in series between transmission line segment 90 and control port 58. Transmission line segment 90 may be coupled in series between transmission line segment 94 and load port 60.

If desired, reconfigurable matching network 62 may exhibit a first capacitance 98 coupled between ground 64 (or another reference potential) and a circuit node 102 between transmission line segment 92 and differential input port 56A. Reconfigurable matching network 62 may also exhibit a second capacitance 98 coupled between ground 64 (or another reference potential) and a circuit node 104 between transmission line segment 96 and differential input port 56B. Capacitances 98 and 100 may each be equal to capacitance $C_{dev}$, for example. Capacitance $C_{dev}$ represents the power amplifier output capacitance and may be absorbed into reconfigurable matching network 62.

A single-ended load impedance $Z_L$ may be present at load port 60 (e.g., load port 60 may be an unbalanced port). Load impedance $Z_L$ may characterize the impedance of the load coupled to load port 60 (e.g., the corresponding antenna 34). Load impedance $Z_L$ may change as the load impedance of antenna 34 and thus the VSWR of antenna 34 changes over time (e.g., as environmental conditions around antenna 34 change over time, such as when an external object moves towards or away from antenna 34 in a manner that changes the load impedance seen by the antenna). Load impedance $Z_L$ may absorb a load capacitance CL that represents the parasitic capacitance or additional capacitance at the load. A factor $Y_L$ may be defined as $Y_L=1/Z_L$.

Reconfigurable matching network 62 may include an adjustable (reconfigurable) impedance termination such as adjustable termination 68 coupled to control port 58. Adjustable termination 68 may include any desired circuit components coupled together in series, in parallel, and/or in any other desired manner between control port 58 and ground 64 (or another reference potential). For example, as shown by portion 80 of FIG. 4, adjustable termination 68 may include one or more resistors 72, one or more capacitors 74, one or more inductors 76, and/or one or more switches 78.

Adjustable termination 68 may exhibit an impedance $Z_{CTRL}$. Control port 58 may exhibit a control port impedance given by the impedance $Z_{CTRL}$ of adjustable termination 68. Impedance $Z_{CTRL}$ is therefore sometimes referred to herein as control port impedance $Z_{CTRL}$. Adjustable termination 68 may receive control signals CTRL from control circuitry 14 (FIG. 1). Control circuitry CTRL may adjust the state of one or more of the components of adjustable termination 68 to adjust, tune, or reconfigure the control port impedance $Z_{CTRL}$ of adjustable termination 68 and thus control port 58. Control signal CTRL may, for example, adjust one or more varactors, adjustable inductors, and/or switches 78 in adjustable termination 68 to configure adjustable termination 68 to exhibit a selected or desired control port impedance $Z_{CTRL}$. If desired, control signal CTRL may adjust control port impedance $Z_{CTRL}$ based on the load impedance $Z_L$ of load port 60 (e.g., based on a VSWR mismatch with the corresponding antenna 34) to optimize the performance and linearity of amplifier 38 across different load impedances or VSWRs.

Coupled lines 88A and coupled lines 88B may each exhibit an electrical length θ, an even mode characteristic impedance $Z_{0e}$, and an odd mode characteristic impedance $Z_{0o}$. Each pair of coupled lines 88 is characterized by its corresponding Y-matrix, shown by equation 1.

$$Y=\begin{bmatrix} -jY_p\cot\theta & jY_m\cot\theta & -jY_m\csc\theta & jY_p\csc\theta \\ jY_m\cot\theta & -jY_p\cot\theta & jY_p\csc\theta & -jY_m\cot\theta \\ -jY_m\csc\theta & jY_p\csc\theta & -jY_p\cot\theta & jY_m\cot\theta \\ jY_p\csc\theta & -jY_m\csc\theta & jY_m\cot\theta & -jY_p\cot\theta \end{bmatrix} \tag{1}$$

In equation 1, $Y_p=(Y_{0o}+Y_{0e})/2$, $Y_m=(Y_{0o}-Y_{0e})/2$, $Y_{0e}=1/Z_{0e}$, and $Y_{0o}=1/Z_{0o}$. The coupling factor k of coupled lines 88 is defined by equation 2.

$$k=\frac{Z_{0o}-Z_{0e}}{Z_{0o}+Z_{0e}}=\frac{Y_{0o}-Y_{0e}}{Y_{0o}+Y_{0e}}. \tag{2}$$

By applying boundary conditions to the center-tap and the inner connection terminal, the Y-matrix of the "four-port" model formed by coupled lines 88A and 88B of FIG. 4 is given by equation 3.

$$Y=\begin{bmatrix} -jY_p\cot2\theta & -j\frac{Y_m}{2}\csc\theta & j\frac{Y_m}{2}\csc\theta & jY_p\csc2\theta \\ -j\frac{Y_m}{2}\csc\theta & j\frac{Y_m^2-2Y_p^2}{2Y_p}\cot\theta & j\frac{Y_m^2}{2Y_p}\cot\theta & j\frac{Y_m}{2}\csc\theta \\ j\frac{Y_m}{2}\csc\theta & j\frac{Y_m^2}{2Y_p}\cot\theta & j\frac{Y_m^2-2Y_p^2}{2Y_p}\cot\theta & -j\frac{Y_m}{2}\csc\theta \\ jY_p\csc2\theta & j\frac{Y_m}{2}\csc\theta & -j\frac{Y_m}{2}\csc\theta & jY_p\cot2\theta \end{bmatrix} \tag{3}$$

Reconfigurable matching network 62 may achieve broadband impedance transformation, matching, and balun functionalities even as the VSWR at load port 60 changes over time.

When the input port is driven using differential signals (e.g., in an odd mode excitation), a current $I_2$ flows over differential input port 56A and a current $I_3$ flows over differential input port 56B, where $I_2=-I_3=I_{DEV}$. There is also a voltage $V_2$ present at differential input port 56A and a voltage $V_3$ present at differential input port 56B. Using the matrix of equation 3, current $I_2$ may be defined by equation 4 and current $I_3$ may be defined by equation 5, where ω is angular frequency.

$$j\frac{Y_m}{2}\csc\theta\cdot V_1+j\left(\frac{Y_m^2-2Y_p^2}{2Y_p}\cot\theta+\omega C_{dev}\right)\cdot V_2+j\frac{Y_m^2}{2Y_p}\cot\theta\cdot V_3+j\frac{Y_m}{2}\csc\theta\cdot V_4=I_2, \tag{4}$$

$$-j\frac{Y_m}{2}\csc\theta\cdot V_1+j\frac{Y_m^2}{2Y_p}\cot\theta\cdot V_2+j\left(\frac{Y_m^2-2Y_p^2}{2Y_p}\cot\theta+\omega C_{dev}\right)\cdot V_3-j\frac{Y_m}{2}\csc\theta\cdot V_4=I_3. \tag{5}$$

Combining equations 4 and 5 produces equation 6, which holds for differential excitation where $I_2=-I_3$, which requires $V_2=-V_3=V_{dev}$.

$$j\left(\frac{Y_m^2-Y_p^2}{Y_p}\cot\theta+\omega C_{dev}\right)\cdot(V_2+V_3)=I_2+I_3=0. \tag{6}$$

The resulting current and voltage relationship across ports can then be obtained via the Y-matrix of equation 3, producing equation 7.

$$\begin{bmatrix} I_{dev} \\ I_L \\ I_{ctrl} \end{bmatrix}=\begin{bmatrix} -jY_p\cot\theta+j\omega C_{dev} & -j\frac{Y_m}{2}\csc\theta & j\frac{Y_m}{2}\csc\theta \\ -jY_m\csc\theta & -jY_p\cot2\theta & jY_p\csc2\theta \\ jY_m\csc\theta & jY_p\csc2\theta & -jY_p\cot2\theta \end{bmatrix}\begin{bmatrix} V_{dev} \\ V_L \\ V_{ctrl} \end{bmatrix}. \tag{7}$$

There is also a current $I_L$ and a voltage $V_L$, at load port 60, where $I_L=-Y_LV_L$, and a current $I_{CTRL}$ and a voltage $V_{CTRL}$ at control port 58, where $I_{CTRL}=-Y_{CTRL}$ $V_{CTRL}$ and $Y_{CTRL}=1/Z_{CTRL}$. Combining this with equation 7 produces equation 10.

$$Y_{in}=\frac{I_{dev}}{V_{dev}}=-jY_p\cot\theta+j\omega C_{dev}+\frac{1}{2}Y_m^2\csc^2\theta\frac{Y_L+Y_{ctrl}+2jY_p\tan\theta}{Y_LY_{ctrl}-jY_p\cot2\theta(Y_L+Y_{ctrl})+Y_P^2}. \tag{10}$$

As shown by equation 10, the impedance $Z_{in}$ seen by amplifier 38 (where $Z_{in}=1/Y_{in}$) is determined by both the load impedance $Z_L=1/Y_L$ and the reconfigurable control port impedance $Z_{CTRL}=1/Y_{CTRL}$. Therefore, by controlling the reconfigurable impedance $Z_{CTRL}$ of adjustable termination 68 (e.g., using control signal CTRL) based on the mismatched load $Z_L$ under the current VSWR of the corresponding antenna 34, the impedance seen by amplifier 38 can be recovered (e.g., compensating for mismatched load impedance or VSWR).

In a simplest case, adjustable termination 68 may be implemented using a single switch 78. Switch 78 may include a single transistor, as shown in portion 80 of FIG. 4. As shown by portion 80 of FIG. 4, switch 78 may include a transistor having a first source/drain terminal 82 coupled to control port 58, a second source/drain terminal 84 coupled to ground 64, and a gate terminal 86 that receives control signal CTRL.

At a first time, control signal CTRL may be asserted at a first level (e.g., may be turned on or asserted at a relatively high level or a binary/logic high level) to turn switch 78 on (e.g., to close, activate, or enable switch 78), forming a short circuit impedance or a low termination impedance $R_{ON}$ between source/drain terminals 82 and 84 and thus between control port 58 and ground 64.

At a second time, control signal CTRL may be asserted at a second level (e.g., may be turned off or asserted at a relatively low level or a binary/logic low level) to turn switch 78 off (e.g., to open, deactivate, or disable switch 78), forming an open circuit impedance or a relatively large parasitic capacitance $C_{OFF}$ between source/drain terminals 82 and 84 and thus between control port 58 and ground 64.

When load port 60 is presented with a nominal antenna load (e.g., a first VSWR value corresponding to a 50 Ohm impedance), switch 78 may be turned on to couple low termination impedance $R_{ON}$ between control port 58 and ground 64, providing a broadband optimum load impedance for amplifier 38. On the other hand, when load port 60 is presented with a mismatched antenna load (e.g., a second VSWR value corresponding to a non-50-Ohm impedance such as a 25 Ohm impedance), switch 78 may be turned off to couple parasitic capacitance $C_{OFF}$ between control port 58 and ground 64, configuring amplifier 38 to continue to see the broadband optimum load impedance despite the change in loading at the corresponding antenna 34. This example is illustrative and non-limiting. If desired, adjustable termination 68 may have more than two states for coupling more than two different control port impedances $Z_{CTRL}$ (e.g., a range of different control port impedances) to control port 58.

Figure 5:
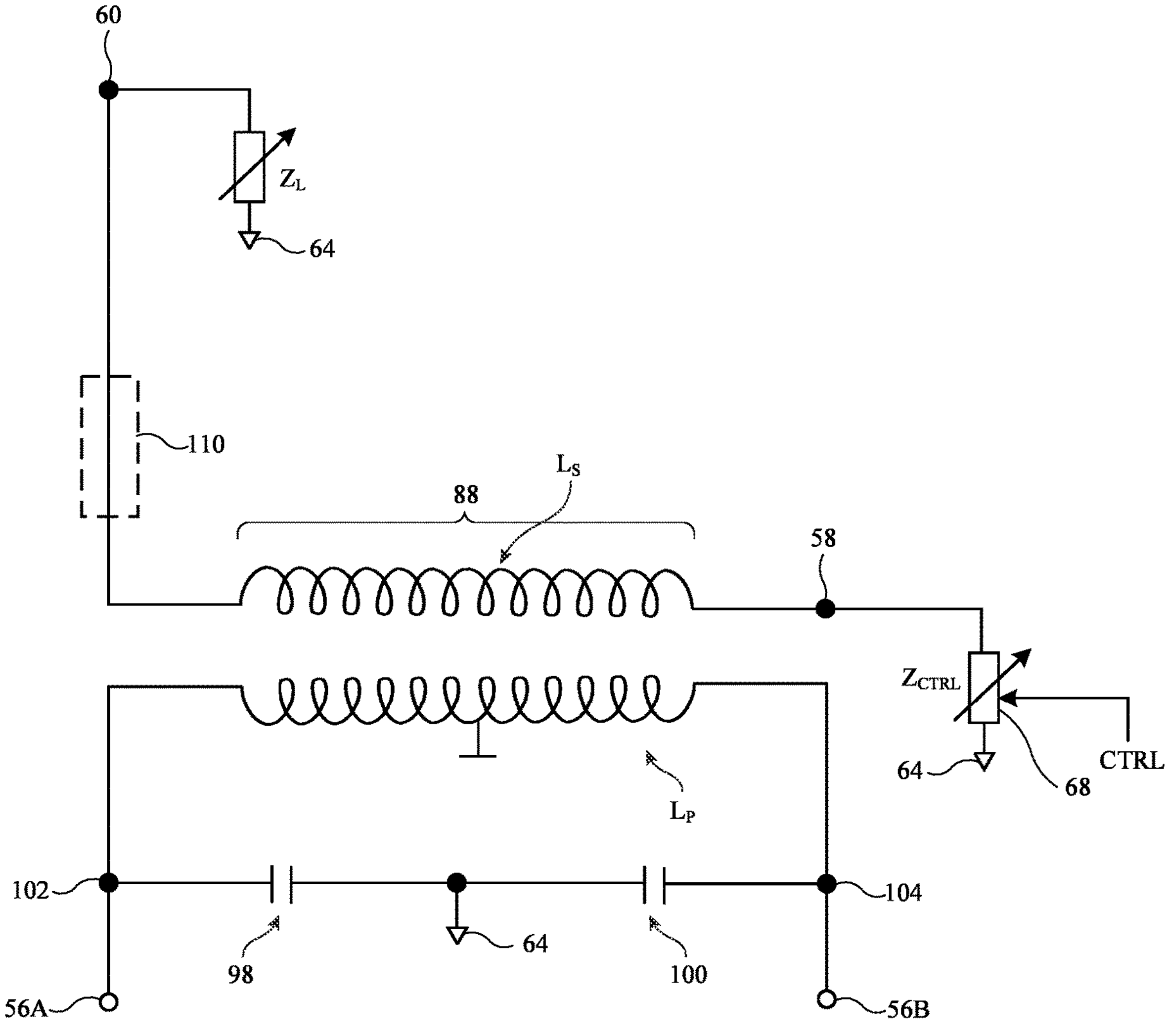
FIG. 5 is a circuit diagram of an illustrative transformer-based reconfigurable matching network in accordance with some embodiments.

The example of FIG. 4 in which coupled lines 88 include transmission line segments is illustrative and non-limiting. If desired, the coupled lines 88 in reconfigurable matching network 62 may include primary and secondary windings of a transformer. FIG. 5 is a circuit diagram showing one example of how the coupled lines 88 in reconfigurable matching network 62 may include primary and secondary windings of a transformer.

As shown in FIG. 5, the coupled lines 88 in reconfigurable matching network 62 may include a transformer having a first coil, winding, or inductor such as primary coil Lp. The transformer may also have a second coil, winding, or inductor such as secondary coil Ls. Primary coil Lp may sometimes also be referred to herein as the primary winding Lp or primary inductor Lp. Secondary coil Ls may sometimes also be referred to herein as the secondary winding Ls or secondary inductor Ls. Primary coil Lp may form the first line of coupled lines 88. Secondary coil Lp may form the second line of coupled lines 88.

Primary coil Lp may have a first terminal coupled to differential input port 56A and may have an opposing second terminal coupled to differential input port 56B. Secondary coil Ls may have a first terminal coupled to load port 60 and may have an opposing second terminal coupled to control port 58. One or both of primary coil Lp and secondary coil Ls may have a center tap conductor that receives a bias voltage, power supply voltage, ground voltage, or another potential.

When radio-frequency signals are conveyed over differential input ports 56A and 56B, current on primary coil Lp induces a corresponding current on secondar coil Ls via magnetic coupling 114. Magnetic coupling 114 may have a corresponding coupling coefficient $k_m$. If desired, the transformer formed by primary coil Lp and secondary coil Ls may impart a passive voltage/current gain to the signals (e.g., based on the number of turns or windings of primary coil Lp and secondary coil Ls). Control signals CTRL may adjust control port impedance $Z_{CTRL}$ based on load impedance $Z_L$ (e.g., the VSWR of the corresponding antenna) to optimize the performance of amplifier 38 given the current load impedance and/or VSWR. Adjustable termination 68 may be coupled between control port 58 and ground 64 but may have the same electrical effect on the impedance matching performed by reconfigurable matching network 62 as an adjustable impedance termination at location 110 between secondary coil Ls and load port 60, but without requiring placement of circuit components in the signal path between differential input ports 56A/56B and load port 60. Alternatively, adjustable termination 68 may be disposed at location 110

Figure 6:
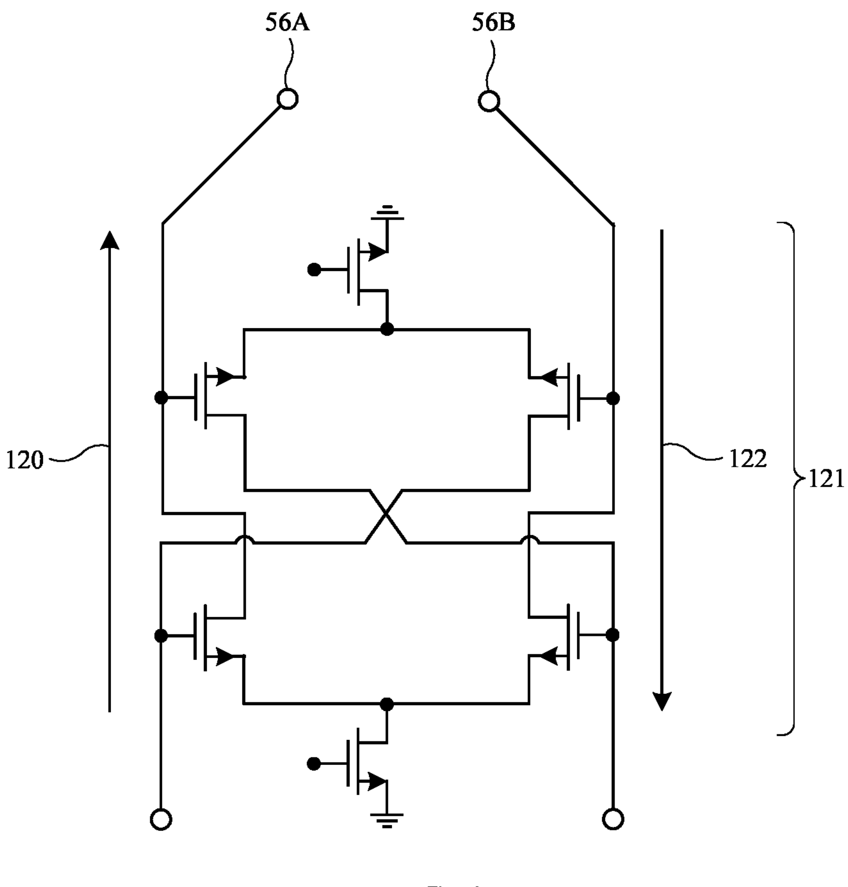
FIG. 6 is a circuit diagram of a stage of an illustrative bi-directional amplifier that may be provided with a reconfigurable matching network in accordance with some embodiments.

In the example of FIGS. 3-5, amplifier 38 is illustrated as a power amplifier. This is illustrative and non-limiting. If desired, amplifier 38 may be a low noise amplifier. In other implementations, amplifier 38 may be a bi-directional amplifier. FIG. 6 is a circuit diagram showing one example of how amplifier 38 may be a bi-directional amplifier. Reconfigurable matching network 62 has been omitted from FIG. 6 for the sake of clarity.

As shown in FIG. 6, amplifier 38 may have a bi-directional amplifier stage 121 coupled to differential input ports 56A and 56B of reconfigurable matching network 62. Bi-directional amplifier stage 121 may be adjustable or switchable between a transmit mode in which radio-frequency signals are conveyed towards differential input ports 56A and 56B, as shown by arrow 160, and a receive mode in which radio-frequency signals are conveyed from differential input ports 56A and 56B, as shown by arrow 122. Implementing amplifier 38 as a bi-directional amplifier may allow the amplifier to amplify both radio-frequency signals that are transmitted by the corresponding antenna and radio-frequency signals that are received by the corresponding antenna.

If desired, adjustable termination 68 of reconfigurable matching network 62 (FIGS. 4 and 5) may have different states depending on whether the bi-directional amplifier is transmitting or receiving signals. For example, adjustable termination 68 may be switched between at least first and second states (e.g., for coupling at least first and second different control port impedances $Z_{CTRL}$ to control port 58) while amplifier 38 transmits signals in the direction of arrow 120 and may be switched between at least third and fourth states (e.g., for coupling at least third and fourth different control port impedances $Z_{CTRL}$ to control port 58) while amplifier 38 receives signals in the direction of arrow 122. Different control port impedances may be required between signal transmission and reception because transmission generally requires high linearity/efficiency whereas reception generally requires high sensitivity, for example.

Figure 7:
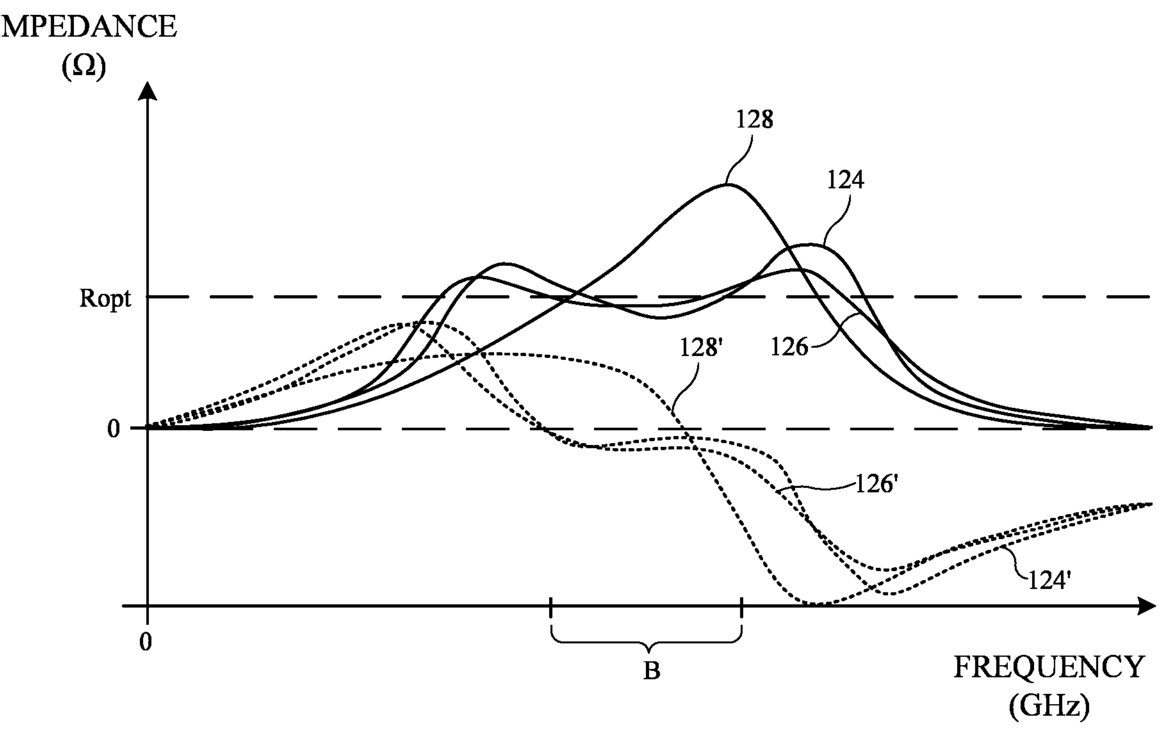
FIG. 7 is a plot of load impedance as viewed by an illustrative amplifier showing how a reconfigurable matching network may optimize performance of the amplifier under different antenna loading conditions in accordance with some embodiments.

FIG. 7 is a plot of the load impedance $Z_{in}$ seen by amplifier 38 (e.g., at load port 60) under different antenna loading conditions and settings of the adjustable termination 68 coupled to control port 58. Curve 124 of FIG. 7 plots the real component of the load impedance $Z_{in}$ seen by amplifier 38 when there is a nominal antenna load of 50 Ohms at load port 60 and adjustable termination 68 is set to exhibit a first control port impedance $Z_{CTRL}$ (e.g., where switch 78 is turned on to couple impedance $R_{ON}$ between control port 58 and ground 64). The imaginary component is shown by curve 124'.

Curve 126 plots the real component of the load impedance $Z_{in}$ seen by amplifier 38 when there is a mismatched antenna load of 25 Ohms at load port 60 (e.g., due to a different environmental impedance loading of antenna 34 by an external object) and adjustable termination 68 is set to exhibit the same first control port impedance $Z_{CTRL}$ (or where there is a short circuit impedance from control port 58 to ground 64). The imaginary component is shown by curve 126'. As shown by curves 126 and 124, when the impedance termination remains fixed (static) and the antenna load (e.g., VSWR) changes, the load impedance $Z_{in}$ seen by amplifier 38 significantly deviates from the optimum load impedance $R_{opt}$ and is significantly narrowed within its operating bandwidth B, which can cause deterioration in the wireless performance (e.g., linearity) of amplifier 38. To mitigate these issues, control signal CTRL may dynamically adjust adjustable termination 68 to exhibit a different control port impedance $Z_{CTRL}$ when the antenna load has changed (e.g., become mismatched) from the nominal antenna load.

Curve 128 plots the real component of the load impedance $Z_{in}$ seen by amplifier 38 when there is the antenna load of 25 Ohms at load port 60 and adjustable termination 68 is set to exhibit a second control port impedance $Z_{CTRL}$ different from the first control port impedance (e.g., where switch 78 is turned off to couple parasitic capacitance Cox between control port 58 and ground 64). The imaginary component is shown by curve 128'. As shown by curves 124 and 128, by adjusting adjustable termination 68 to exhibit a suitable control port impedance $Z_{CTRL}$ based on the mismatched antenna load/VSWR, amplifier 38 is able to see a load impedance $Z_{in}$ at its output (load port 60) that resembles or recovers the nominal impedance across bandwidth B, thereby ensuring that amplifier 38 is able to maintain sufficient levels of wireless performance (e.g., linearity) despite the change in antenna load/VSWR.

Figure 8:
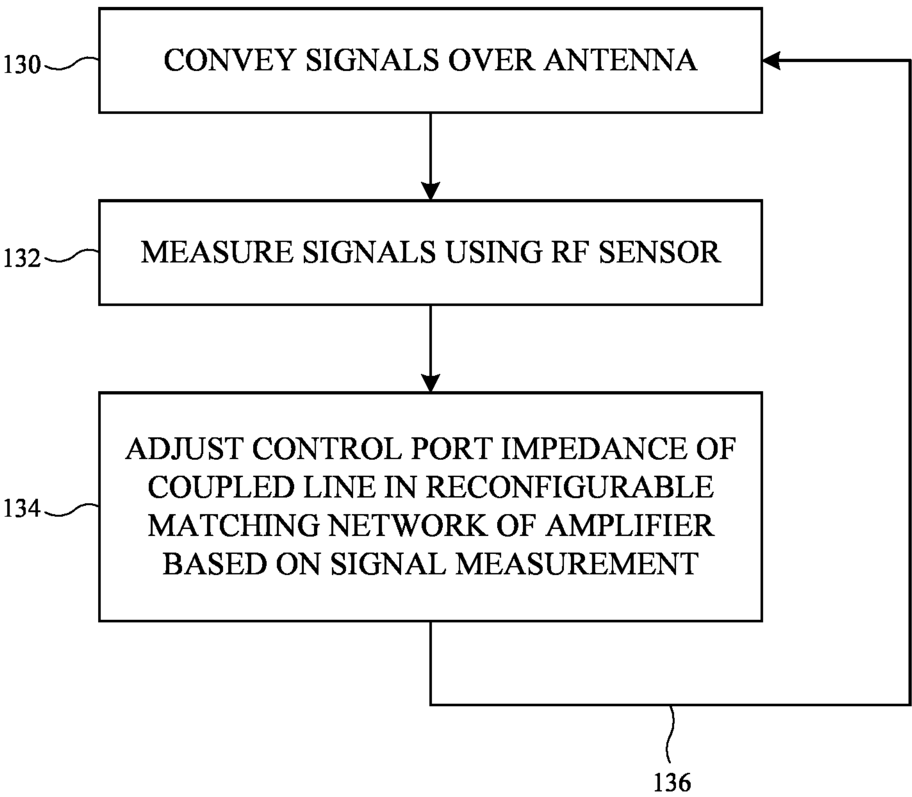
FIG. 8 is a flow chart of illustrative operations associated with conveying radio-frequency signals using an amplifier of the types shown in FIGS. 2-6 in accordance with some embodiments.

FIG. 8 is a flow chart of illustrative that may be performed by device 10 to convey radio-frequency signals using an amplifier 38 having reconfigurable matching network 62. At operation 130, transceiver 28 may begin conveying radio-frequency signals over a given transmission line path 32, amplifier 38, and antenna 34. Amplifier 38 may amplify the signals.

At operation 132, a radio-frequency sensor 44 on transmission line path 32 (FIG. 2) may measure the radio-frequency signals conveyed along transmission line path 32 between amplifier 38 and antenna 34. For example, radio-frequency sensor 44 may generate, gather, measure, sense, detect, or identify complex impedance values, scattering parameters, and/or VSWR values from the radio-frequency signals. The measurements performed by radio-frequency sensor 44 may be indicative of the antenna load seen by amplifier 38 at load port 60 (e.g., under the current environmental loading conditions of the antenna).

At operation 134, control circuitry 14 may adjust the adjustable termination 68 of the reconfigurable matching network 62 in amplifier 38 based on the radio-frequency measurements gathered or performed by radio-frequency sensor 44. Control circuitry 14 may, for example, adjust one or more switches in adjustable termination 68 (e.g., switch 78 of FIG. 4) to configure adjustable termination 68 to exhibit a control port impedance $Z_{CTRL}$ that is selected, based on the radio-frequency measurement, to cause amplifier 38 to see the same nominal input impedance $Z_{in}$ at load port 60 regardless of the current VSWR of the antenna. Processing may then loop back to operation 130 via path 136 to continue to update control port impedance $Z_{CTRL}$ to ensure that amplifier 38 sees the same nominal input impedance $Z_{in}$ regardless of how the environmental loading of antenna 34 changes over time.

While described herein in the context of amplifier 38, reconfigurable matching network 62 need not be formed as a part of an amplifier and may, in general, be disposed at any desired location along a transmission line path 32 between the transceiver and a corresponding antenna 34. If desired, amplifiers having reconfigurable matching network 62 such as amplifier 38 may be disposed within transceiver 28 (FIG. 1) or elsewhere in wireless circuitry 24. Antenna 34 may be integrated into phased antenna array 36 or may be separate from a phased antenna array.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An amplifier having an input and an output, the amplifier comprising:
- a gain stage communicatively coupled to the input; and
- a matching network having first and second ports coupled to the gain stage, a third port at the output, and a fourth port, the matching network including
  - first coupled lines that couple the first port to the third port, wherein the first coupled lines include a first transmission line segment coupled in series between the first port and a reference potential and include a second transmission line segment coupled to the third port,
  - second coupled lines that couple the second port to the fourth port, and
  - an adjustable termination coupled to the fourth port.

2. The amplifier of claim 1, wherein the adjustable termination is configured to exhibit a first impedance while the third port exhibits a first load impedance and is configured to exhibit a second impedance different from the first impedance while the third port exhibits a second load impedance different from the first load impedance.

3. The amplifier of claim 1, wherein the adjustable termination is configured to receive a control signal that adjusts an impedance of the adjustable termination.

4. The amplifier of claim 3, wherein the adjustable termination comprises a switch that is controlled by the control signal.

5. The amplifier of claim 4, wherein the switch has a first source/drain terminal coupled to the fourth port, a second source/drain terminal coupled to a reference potential, and a gate terminal configured to receive the control signal.

6. The amplifier of claim 4, wherein the switch is configured to be in a first state while the third port has a first load impedance and is configured to be in a second state while the third port has a second load impedance different from the first load impedance.

7. The amplifier of claim 1, wherein the second coupled lines comprise:
- a third transmission line segment coupled between the second port and the reference potential; and
- a fourth transmission line segment coupled in series between the second transmission line segment and the fourth port.

8. The amplifier of claim 1, wherein the amplifier is a bi-directional amplifier configured to transmit and receive radio-frequency signals, the adjustable termination being configured to exhibit a first impedance while the amplifier transmits the radio-frequency signals and being configured to exhibit a second impedance different from the first impedance while the amplifier receives the radio-frequency signals.

9. The amplifier of claim 1, wherein the first transmission line segment has a first end coupled to the first port and has a second end opposite the first end that is coupled to the reference potential.

10. The amplifier of claim 9, wherein the first transmission line segment is near-field coupled to the second transmission line segment.

11. The amplifier of claim 10, wherein the second coupled lines are near-field coupled to each other.

12. Wireless circuitry comprising:
- a transmission line path configured to convey a radio-frequency signal; and
- an amplifier disposed on the transmission line path and configured to amplify the radio-frequency signal, wherein the amplifier has an output matching network that includes
  - an input port,
  - a load port,
  - a control port,
  - coupled lines having a first line coupled in series between the input port and a reference potential and having a second line coupled in series between the load port and the control port, and
  - an adjustable termination coupled to the control port.

13. The electronic device wireless circuitry of claim 12, further comprising:
- a radio-frequency sensor disposed on the transmission line path, the radio-frequency sensor being configured to measure a load impedance based on the radio-frequency signal; and
- one or more processors configured to adjust an impedance of the adjustable termination based on the load impedance.

14. The wireless circuitry of claim 12, wherein the coupled lines comprise a transformer, the first line includes a first coil of the transformer, and the second line includes a second coil of the transformer.

15. The wireless circuitry of claim 12, wherein the first line includes a first transmission line segment and the second line includes a second transmission line segment.

16. The wireless circuitry of claim 12, further comprising:

a third line coupled in series between the first second line and the load port; and a fourth line coupled to the input port and the reference potential, wherein the fourth line is near-field coupled to the third line and wherein the first line is near-field coupled to the second line.

17. An amplifier having an input and an output, the amplifier comprising:

a gain stage communicatively coupled to the input; and a matching network having first and second ports coupled to the gain stage, a third port at the output, and a fourth port, the matching network including a first pair of coupled lines, the first pair of coupled lines including a first transmission line segment coupled in series between the first port and a reference potential and including a second transmission line segment, a third transmission line segment coupled in series between the second transmission line segment and the third port, and an adjustable termination coupled to the fourth port.

18. The amplifier of claim 17, wherein the first transmission line segment is near-field coupled to the second transmission line segment.

19. The amplifier of claim 18, wherein the matching network further comprises:

a second pair of coupled lines, wherein the second pair of coupled lines includes the third transmission line segment and includes a fourth transmission line segment, the fourth transmission line segment being coupled in series between the second port and the reference potential.

20. The amplifier of claim 19, wherein the third transmission line segment is near-field coupled to the fourth transmission line segment.

* * * * *